(12) United States Patent
Wu

(10) Patent No.: US 8,247,995 B2
(45) Date of Patent: Aug. 21, 2012

(54) CONTROL SYSTEM FOR MULTIPLE LIGHT SOURCES

(75) Inventor: Chun-Te Wu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 257 days.

(21) Appl. No.: 12/697,350

(22) Filed: Feb. 1, 2010

(65) Prior Publication Data

US 2011/0148320 A1    Jun. 23, 2011

(30) Foreign Application Priority Data

Dec. 18, 2009  (CN) .......................... 2009 1 0311810

(51) Int. Cl.
*H05B 37/02*   (2006.01)

(52) U.S. Cl. .......................... 315/294; 315/247; 315/307

(58) Field of Classification Search .................. 315/149, 315/247, 287, 291, 294, 307, 360

See application file for complete search history.

(56) References Cited

U.S. PATENT DOCUMENTS

| | | | | |
|---|---|---|---|---|
| 4,359,670 A * | 11/1982 | Hosaka et al. | ................. | 315/307 |
| 4,524,356 A * | 6/1985 | Kodera et al. | ................. | 340/904 |
| 2004/0183469 A1 * | 9/2004 | Lin et al. | ....................... | 315/247 |
| 2006/0214603 A1 * | 9/2006 | Oh et al. | ........................ | 315/246 |
| 2009/0167210 A1 * | 7/2009 | Nguyen et al. | ................ | 315/307 |
| 2009/0212713 A1 * | 8/2009 | Ozasa | ........................... | 315/287 |
| 2011/0068689 A1 * | 3/2011 | Scenini et al. | ................. | 315/77 |

* cited by examiner

*Primary Examiner* — Tung X Le

(74) *Attorney, Agent, or Firm* — Altis Law Group, Inc.

(57) ABSTRACT

An exemplary control system for multiple light sources includes a clock circuit, a frequency dividing circuit, a recombining circuit, a power control circuit, and a triggering circuit. The clock circuit is configured to output a plurality of clock signals. The frequency dividing circuit is configured to divide the frequency of the clock signals to get a number of reference clock signals. The recombining circuit is configured to recombine the reference clock signals to get a plurality of timing signals. The power control circuit is configured to output electrical power to the multiple light sources according to the timing signals. The triggering circuit is configured to power on the light sources according to a received command.

20 Claims, 3 Drawing Sheets

CONTROL SYSTEM FOR MULTIPLE LIGHT SOURCES

BACKGROUND

1. Technical Field

The disclosure relates to control technology for electronic devices, and particularly, to a control system for multiple light sources.

2. Description of Related Art

Some electronic devices, such as mobile phones or digital cameras for example, often include a number of light sources, such as light emitting diodes (LEDs), that are brightness controlled by software and/or hardware.

However, all of the light sources of the electronic devices are often controlled to be turned on at a same time, thereby consuming a lot of electrical power. It is not good for energy-saving.

Therefore, it is desirable to provide a control system for multiple light sources, which can overcome the problems described above.

DETAILED DESCRIPTION

Figure 1:
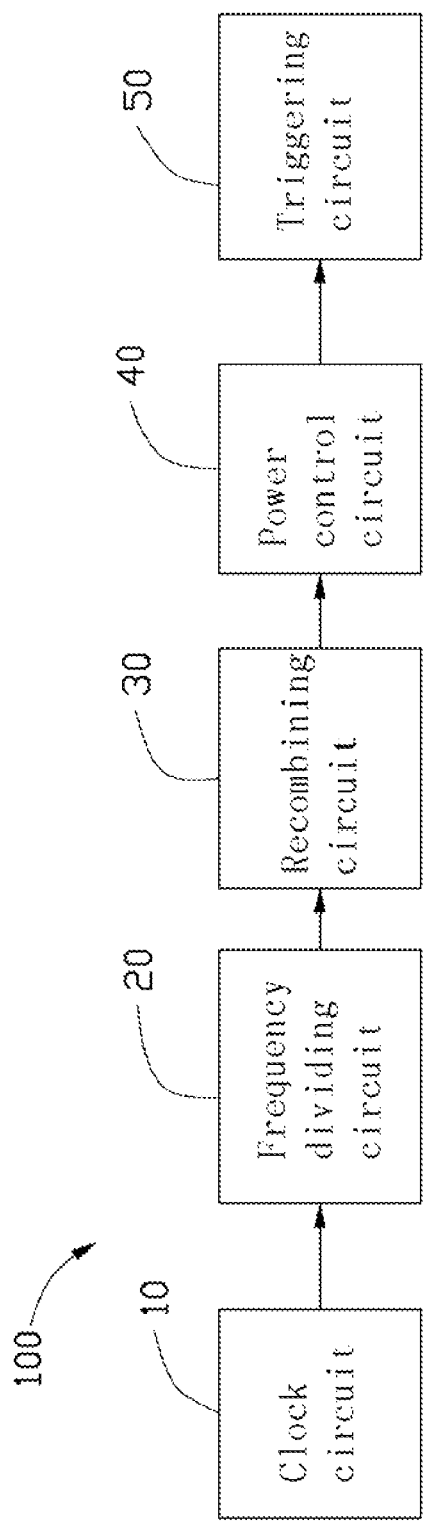
FIG. 1 is a functional block diagram of a control system for multiple light sources, according to an exemplary embodiment.

Referring to FIG. 1, a control system 100 for multiple light sources 200 according to an exemplary embodiment includes a clock circuit 10, a frequency dividing circuit 20, a recombining circuit 30, a power control circuit 40, and a triggering circuit 50 connected to each other in sequence, with the triggering circuit 50 connected to the light sources 200.

Figure 2:
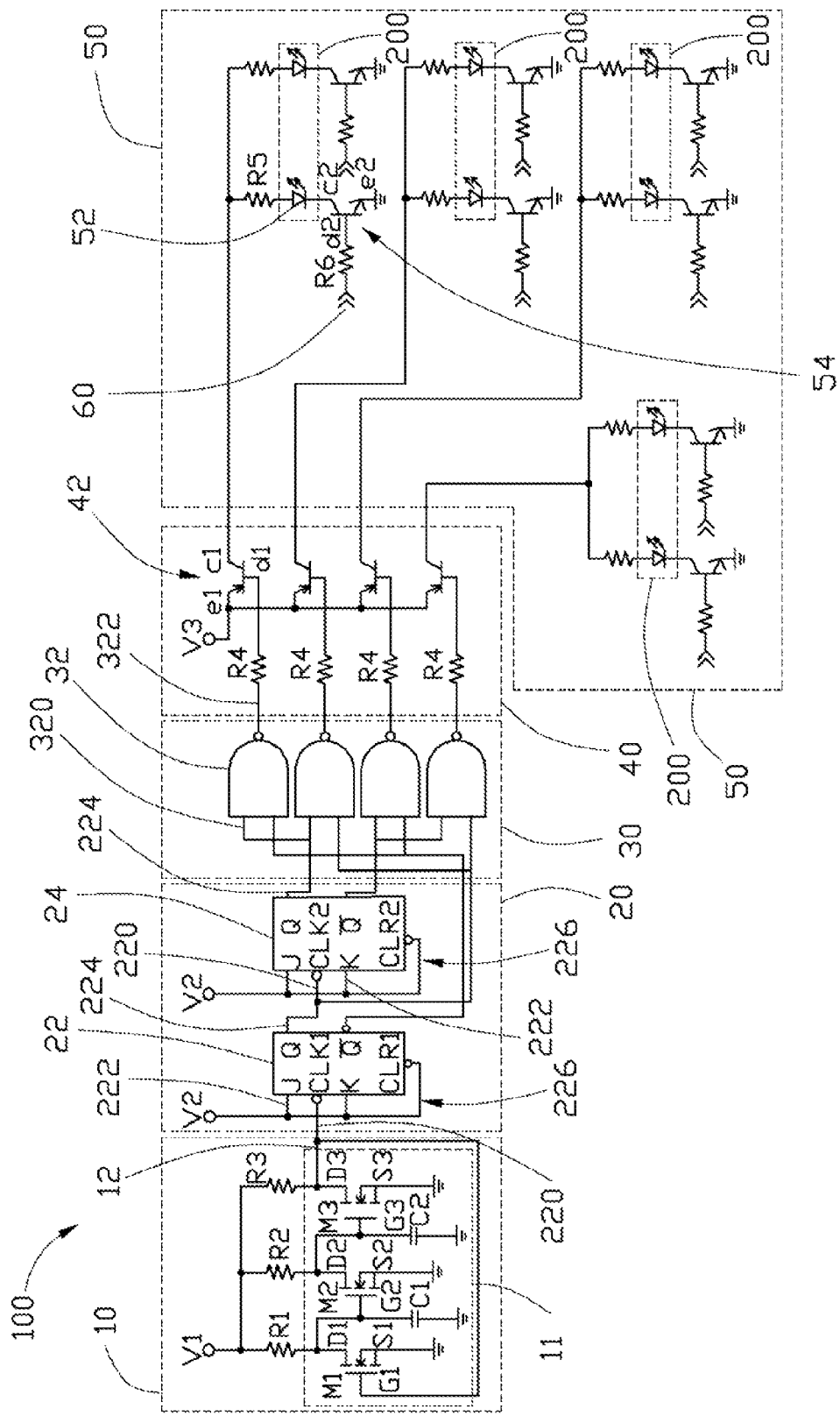
FIG. 2 is a circuit diagram of one embodiment of the control system for multiple light sources of FIG. 1.

Further referring to FIG. 2, the clock circuit 10 is configured to output a number of clock signals when a command is input. In the present embodiment, the clock circuit 10 outputs clock impulses (clock signals) at a kilohertz (kHz) rate. The clock circuit 10 includes a feedback sub-circuit 11 including three cascaded field-effect transistors M1, M2, M3 connected to each other. The three field-effect transistors M1, M2, M3 are connected in parallel to a first power source V1. A clock output 12 of the feedback sub-circuit 11 is connected to the frequency dividing circuit 20.

In detail, the transistors M1, M2, M3 respectively have gate electrodes G1, G2, G3, drain electrodes D1, D2, D3, and source electrodes S1, S2, S3. The clock output 12 is received from the drain electrode D3 of the field-effect transistor M3. The output drain electrode D1 is connected to the input gate electrode G2, the output drain electrode D2 is connected to the input gate electrode G3, and the output drain electrode D3 is connected to the input gate electrode G1 to get a signal feedback thereto. Furthermore, the drain electrodes D1, D2, D3 are connected to the first power source V1 in parallel via first corresponding resistors R1, R2, R3, respectively. In one exemplary embodiment, the voltage of the first power source V1 is about 5 volts, the resistor R1 is about 1 kilo-ohms, while the resistors R2 and R3 are both about 2 kilo-ohms.

Each of the source electrodes S1, S2, S3 are connected to ground. In the present embodiment, the source electrode S1 of the field-effect transistor M1 is connected to ground directly, the source electrode S2 of the field-effect transistor M2 is connected to ground via a corresponding capacitor C1, and the source electrode S3 of the field-effect transistor M3 is connected to ground via a corresponding capacitor C2.

The frequency dividing circuit 20 includes a first frequency divider 22 and a second frequency divider 24 connected to each other in series. The first frequency dividers 22 and the second frequency divider 24 are electrically connected to two corresponding second power sources V2 in parallel to draw electrical power therefrom.

In detail, each of the first frequency divider 22 and the second frequency divider 24 include a clock input 220, a number of power inputs 222, a number of signal outputs 224 and a clear end 226. The clock input 220 of the first frequency divider 22 is connected to the clock output 12 of the clock circuit 10, to receive the clock signals output from the clock circuit 10. The first frequency divider 22 is configured to halve the frequency of the clock signal. The power inputs 222 and the clear end 226 of the first frequency divider 22 are connected to one of the two second power sources V2 and that of the second frequency divider 24 are connected to other second power sources V2. The signal outputs 224 of the first frequency divider 22 and the second frequency divider 24 are connected to the recombining circuit 30. In addition, the signal outputs 224 of the first frequency divider 22 are electrically connected to the clock input 220 of the second frequency divider 24. As such, the second frequency divider 24 may further halve the frequency of the clock signals from the first frequency divider 22. All of the output signals from the first frequency divider 22 and the second frequency divider 24 serve as the reference clock signals. It is understood that, the first and the second frequency dividers 22, 24 also can divide the frequency, such as dividing a. 1 kHz frequency into other desirable frequencies, such as a 200 Hz frequency.

The recombining circuit 30 is configured to recombine the reference clock signals which are outputted from the first and second frequency dividers 22 and 24, to get a number of timing signals. In the present embodiment, the recombining circuit 30 includes four uniform logic gates 32 connected in parallel. Each logic gate 32 includes two inputs 320 and an output 322. One input 320 of each logic gate 32 is connected to the signal output 224 of the first frequency divider 22, and the other input 320 of each logic gate 32 is connected to the signal output 224 of the second frequency divider 24. Each logic gate 32 combines the reference clock signals from the first and second frequency dividers 22, 24 to be the timing signal to output. The output 322 of each logic gate 32 is connected to the power control circuit 40 and configured to output the timing signals to the power control circuit 40. In the present embodiment, the logic gate 32 is a nand gate. It is understood that, the logic gate 32 can be other kinds of logic gate devices, such as a complex programmable logic device (CPLD) or a field-programmable gate array (FPGA).

The reference clock signals can be combined to form the timing signals in different phases. That is to say, the timing signals may generate a number of impulses within a predetermined interval. In the present embodiment, the predetermined interval is smaller than a persistence of vision.

The power control circuit 40 includes a third power source V3 to provide electrical power to the light sources 200 in turn, according to the outputs of the timing signals. In the present embodiment, the power control circuit 40 includes four cascaded first bipolar junction transistors 42 and four second resistors R4 connected between the four first bipolar junction transistors 42 and the outputs 322 of the logic gates 32 in parallel. In detail, each first bipolar junction transistor 42 includes a first base d1, a first emitter e1 and a collector c1. Each first base d1 is connected to the output 322 of the logic gate 32 via each second resistor R4. Each first emitter e1 is connected to the third power source V3 directly. Each collector c1 is connected to the light source 200.

The triggering circuit 50 is configured to power the light sources 200 connected in parallel, according to a received "turn on" command. The light sources 200 are integrated with the triggering circuit 50.

In the present embodiment, the light sources 200 are constructed with a group of light emitting diode (LED) arrays connected in parallel. Each light source 200 includes two LEDs 52 connected in parallel. The positive pole of each of the two LEDs 52 is connected to the collector c1 of a corresponding one of the first bipolar junction transistors 42 via a respective third resistor R5. The negative pole of each of the two LEDs 52 is connected to a user interface 60 via a respective second bipolar junction transistor 54 and a respective fourth resistor R6. The user interface 60 is configured to receive the "turn on" or "turn off" command from the user.

Each second bipolar junction transistor 54 includes a second base d2, a second emitter e2 and a second collector c2. The second base d2 of the second bipolar junction transistor 54 is connected to the corresponding fourth resistor R6 in series. The second collector c2 of the second bipolar junction transistor 54 is connected to the negative pole of the corresponding LED 52. The second emitter e2 of the second bipolar junction transistor 54 is grounded directly. When the user interface 60 inputs a "turn on" command, the third power source V3 may supply current to the positive pole of each LED 52, so that the LED 52 is conducted and lights up.

When the user interface 60 receives a command, the first, second and third power sources V1, V2 and V3 all are powered on. The clock circuit 10 generates a number of clock signals, and transmits the clock signals to the first frequency divider 22 and the second frequency divider 24 in sequence. Then the first frequency dividers 22 and the second frequency divider 24 divide the frequency of the clock signals to be a number of frequencies to get a number of reference signals. The reference signals are transmitted to the recombining circuit 30 and recombined to be a number of timing signals. The timing signals signal the third power source V3 of the power control circuit 40 through the first bipolar junction transistor 42, to provide electrical power to the triggering circuit 50. The triggering circuit 50 triggers the light sources 200 to be turned on in turn within the persistence of vision. As such, same to the process of turning on the light sources 200, the light source also can be turned off in the persistence of vision. As a result, the light sources 200 can be turned on or turned off in turn.

Figure 3:
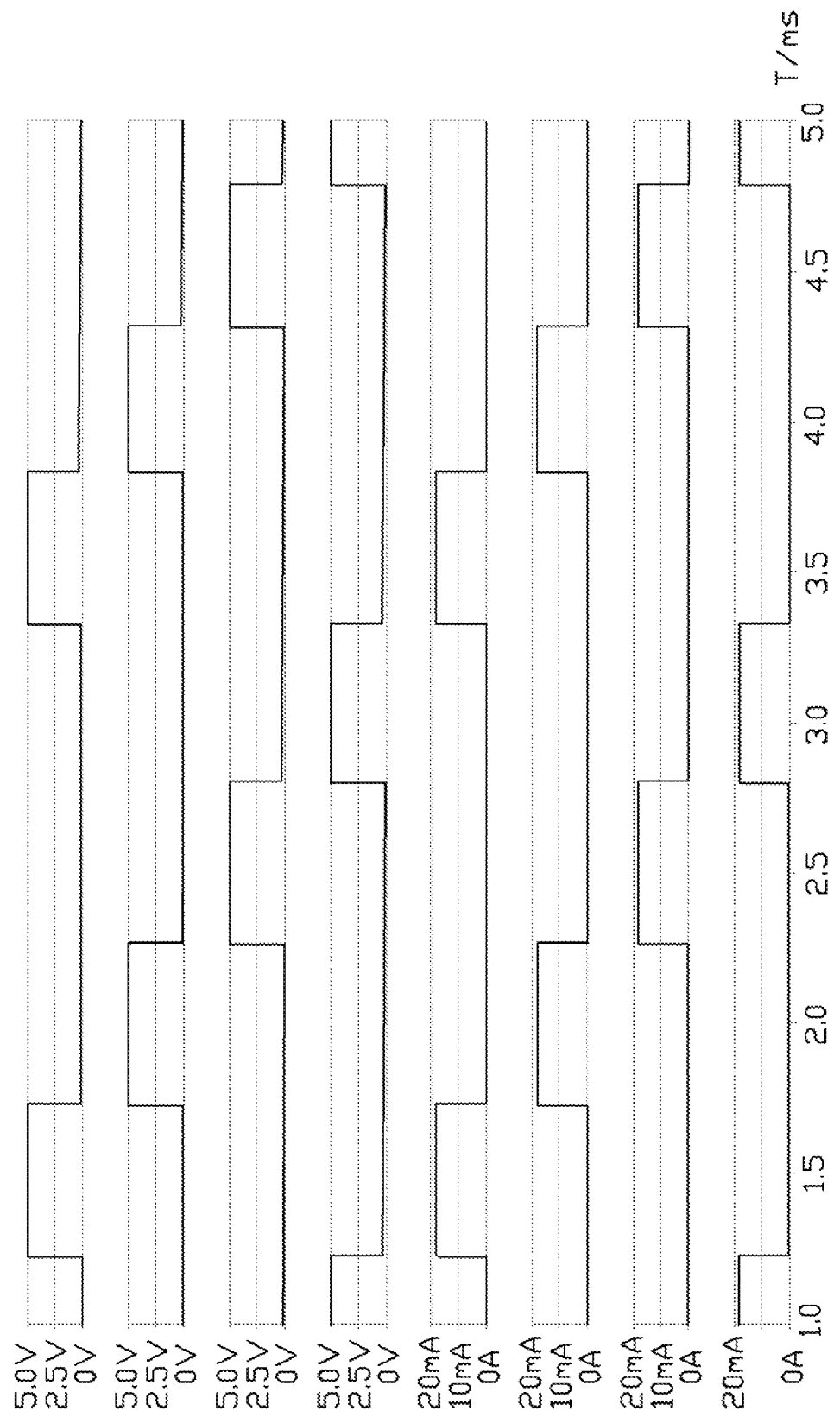
FIG. 3 is one example of a simulation of power consumption of the light sources controlled by the control system of FIG. 1.

Referring to FIG. 3, a simulation of the power consumption of the light sources 200 controlled by the control system 100 is shown. In the present embodiment, the horizontal axis represents working time t (ms) of the light sources 200, and the vertical axis represents working voltage and working current of the light sources 200. The power consumed is equal to a product of the working voltage and the working current. Since the light sources 200 draw power in turn, each light source 200 consumes less power than they would if all light sources were kept on at the same time. Therefore, energy is saved.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A control system for multiple light sources, comprising:
   a clock circuit configured to output a plurality of clock signals;
   a frequency dividing circuit connected to the clock circuit and configured to divide the frequency of the clock signals, to get a plurality of reference clock signals;
   a recombining circuit connected to the frequency dividing circuit and configured to recombine the reference clock signals, to get a plurality of timing signals;
   a power control circuit connected to the recombining circuit and configured to output electrical power to the multiple light sources according to the timing signals; and
   a triggering circuit, the triggering circuit interconnecting the power control circuit and the multiple light sources, and configured to power on the light sources according to a received command;
   wherein the clock circuit comprises a feedback sub-circuit comprising a plurality of cascaded field-effect transistors connected to each other, inputs of the feedback sub-circuit are connected in parallel to a first power source, and an output of the feedback sub-circuit is connected to the frequency dividing circuit.

2. The control system for multiple light sources of claim 1, wherein the frequency dividing circuit comprises a plurality of frequency dividers connected to each other in series, and each frequency divider is electrically connected to a second power source to provide electrical power thereto.

3. The control system for multiple light sources of claim 2, wherein each frequency divider comprises a clock input, a plurality of power inputs, a plurality of signal outputs and a clear end, the clock input of one frequency divider is connected to the output of the clock circuit, the power inputs and the clear end of each frequency divider are connected to the corresponding second power source, and the signal outputs of each frequency divider are connected to the recombining circuit.

4. The control system for multiple light sources of claim 3, wherein one of the signal outputs of the frequency divider whose clock input is connected to the output of the clock circuit is connected to the cascaded clock input of another frequency divider of the frequency dividing circuit.

5. The control system for multiple light sources of claim 4, wherein the recombining circuit comprises a plurality of uniform logic gates connected in parallel, each logic gate comprises two inputs and an output, one input of each logic gate is connected to the signal output of one frequency divider, the other input of each logic gate is connected to the signal output of another frequency divider, and the output of each logic gate is connected to the power control circuit and configured to output the timing signals.

6. The control system for multiple light sources of claim 5, wherein the power control circuit comprises a plurality of first bipolar junction transistors connected in parallel, each first bipolar junction transistor comprises a base, an emitter and a collector, the base is connected to the output of the corresponding logic gate, the emitter is connected to a third power source directly, and the collector is connected to the corresponding light source.

7. The control system for multiple light sources of claim 6, wherein the power control circuit further comprises a plurality of first resistors, and the base of the each first bipolar junction transistor is connected to the output of the corresponding logic gate via one of the first resistors.

8. The control system for multiple light sources of claim 7, wherein each light source is a light emitting diode (LED).

9. The control system for multiple light sources of claim 8, wherein a positive pole of the LED is connected to the collector of the corresponding first bipolar junction transistor via a corresponding second resistor, a negative pole of the LED is connected to a user interface via a collector of a corresponding second bipolar junction transistor and a corresponding third resistor connected to a base of the corresponding second bipolar junction transistor, and an emitter of the corresponding second bipolar junction transistor is grounded directly.

10. A control system for multiple light sources, comprising:
   a clock circuit configured to output a clock signal;
   a frequency dividing circuit connected to the clock circuit and configured to divide the frequency of the clock signal, to get a plurality of reference clock signals having a plurality of frequencies;
   a recombining circuit connected to the frequency dividing circuit and configured to recombine every two reference clock signals having different frequencies from each other, to get a plurality of different timing signals;
   a power control circuit connected to the recombining circuit and configured to output electrical power to the multiple light sources according to the different timing signals; and
   a triggering circuit, the triggering circuit interconnecting the power control circuit and the multiple light sources, and configured to power on the light sources according to a received command.

11. The control system for multiple light sources of claim 10, wherein the plurality of reference clock signals comprises a plurality of first reference clock signals having a first frequency and a plurality of second reference clock signals having a second frequency.

12. The control system for multiple light sources of claim 11, wherein the recombining circuit recombines each first reference clock signal with a corresponding second reference clock signal, to get the plurality of different timing signals.

13. The control system for multiple light sources of claim 10, wherein the clock circuit comprises a feedback sub-circuit comprising a plurality of cascaded field-effect transistors connected to each other, inputs of the feedback sub-circuit are connected in parallel to a first power source, and an output of the feedback sub-circuit is connected to the frequency dividing circuit.

14. The control system for multiple light sources of claim 13, wherein the frequency dividing circuit comprises a plurality of frequency dividers connected to each other in series, and each frequency divider is electrically connected to a second power source to provide electrical power thereto.

15. The control system for multiple light sources of claim 14, wherein each frequency divider comprises a clock input, a plurality of power inputs, a plurality of signal outputs and a clear end, the clock input of one frequency divider is connected to the output of the clock circuit, the power inputs and the clear end of each frequency divider are connected to the corresponding second power source, and the signal outputs of each frequency divider are connected to the recombining circuit.

16. The control system for multiple light sources of claim 15, wherein one of the signal outputs of the frequency divider whose clock input is connected to the output of the clock circuit is connected to the cascaded clock input of another frequency divider of the frequency dividing circuit.

17. The control system for multiple light sources of claim 16, wherein the recombining circuit comprises a plurality of uniform logic gates connected in parallel, each logic gate comprises two inputs and an output, one input of the logic gate is connected to the signal output of one frequency divider, the other input of the logic gate is connected to the signal output of another frequency divider, and the output of each logic gate is connected to the power control circuit and configured to output the timing signals.

18. The control system for multiple light sources of claim 17, wherein the power control circuit comprises a plurality of first bipolar junction transistors connected in parallel, each first bipolar junction transistor comprises a base, an emitter and a collector, the base is connected to the output of the corresponding logic gate, the emitter is connected to a third power source directly, and the collector is connected to the corresponding light source.

19. The control system for multiple light sources of claim 18, wherein each light source is a light emitting diode (LED).

20. The control system for multiple light sources of claim 19, wherein a positive pole of the LED is connected to the collector of the corresponding first bipolar junction transistor via a corresponding first resistor, a negative pole of the LED is connected to a user interface via a collector of a corresponding second bipolar junction transistor and a corresponding second resistor connected to a base of the corresponding second bipolar junction transistor, and an emitter of the corresponding second bipolar junction transistor is grounded directly.

* * * * *